No. 730,507. PATENTED JUNE 9, 1903.
H. APPLER.
VEHICLE BRAKE.
APPLICATION FILED AUG. 18, 1902.
NO MODEL. 2 SHEETS—SHEET 1.
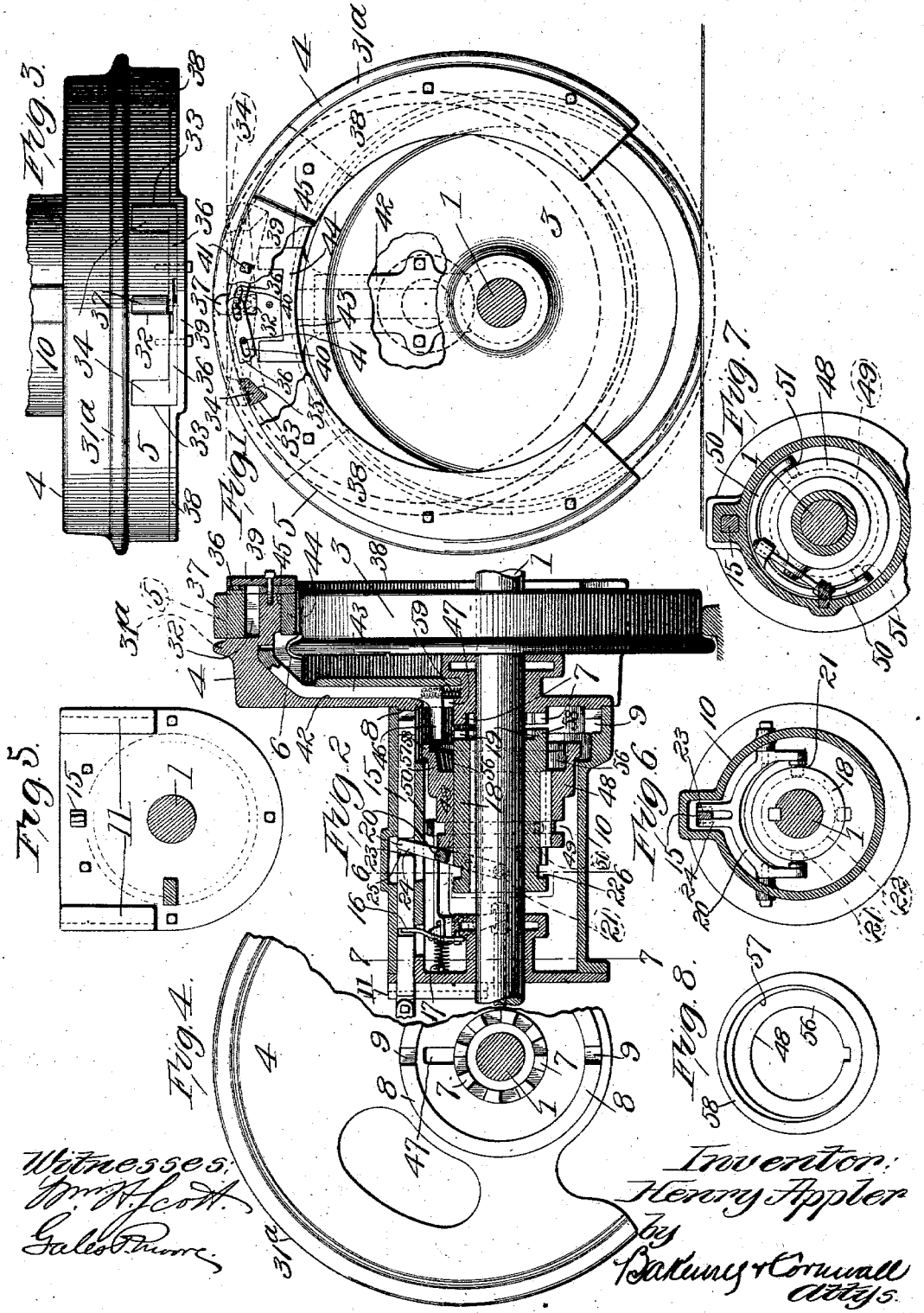
Witnesses:
Inventor:
Henry Appler
by
Bakewell & Cornwall
Attys.

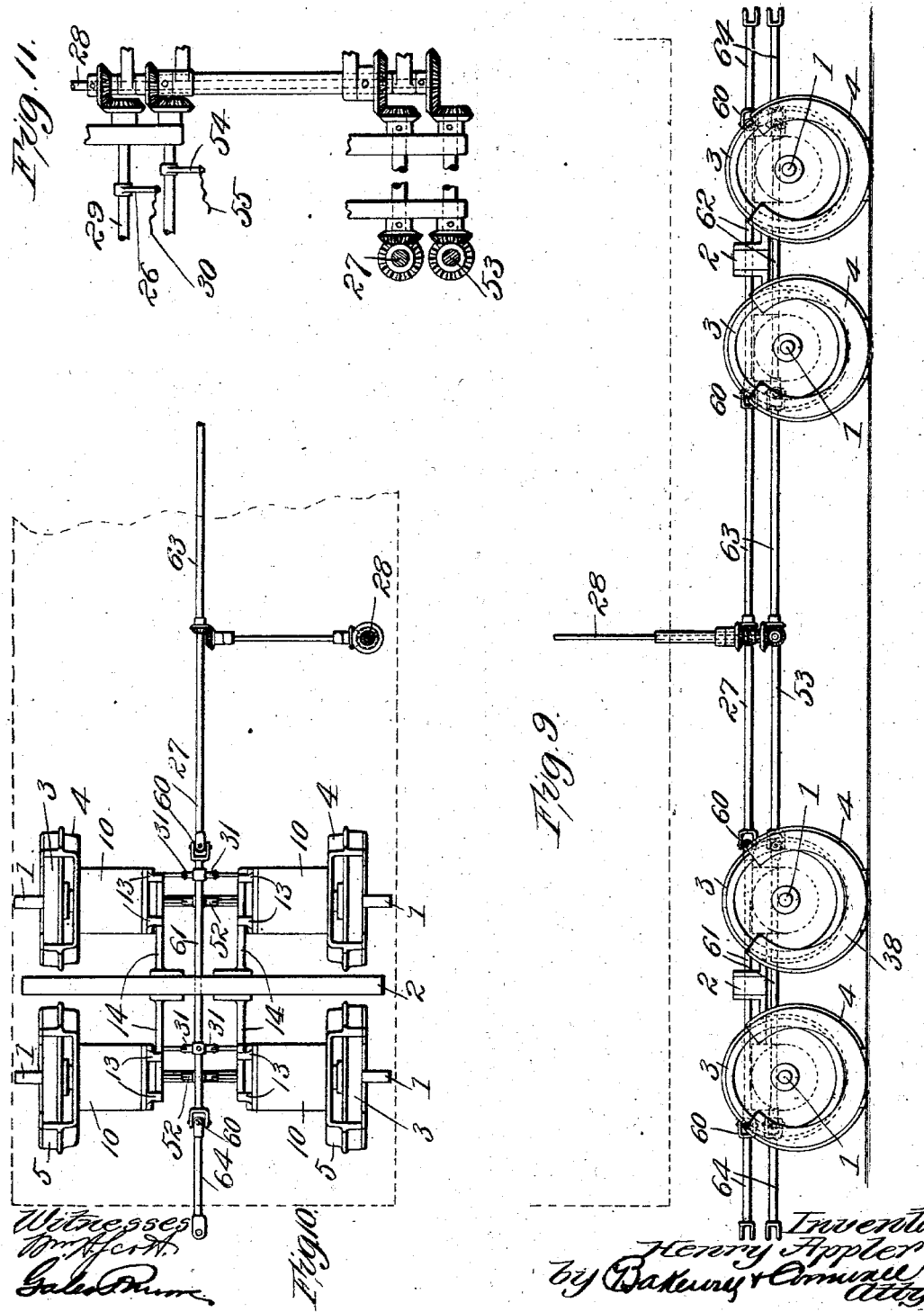

No. 730,507.

Patented June 9, 1903.

UNITED STATES PATENT OFFICE.

HENRY APPLER, OF ST. LOUIS, MISSOURI.

VEHICLE-BRAKE.

SPECIFICATION forming part of Letters Patent No. 730,507, dated June 9, 1903.

Application filed August 18, 1902. Serial No. 120,137. (No model.)

*To all whom it may concern:*

Be it known that I, HENRY APPLER, a citizen of the United States, residing at St. Louis, Missouri, have invented a certain new and useful Improvement in Vehicle-Brakes, of which the following is a full, clear, and exact description, such as will enable others skilled in the art to which it appertains to make and use the same, reference being had to the accompanying drawings, forming part of this specification, in which—

Figure 1 is a front elevation of a wheel and its lifting-plate, certain of the parts being broken away. Fig. 2 is a vertical central sectional elevation. Fig. 3 is a top plan view. Fig. 4 is a fragmentary rear elevation of the lifting-plate. Fig. 5 is a rear end view of the casing. Fig. 6 is a transverse sectional elevation on the line 6 6 of Fig. 2. Fig. 7 is a transverse sectional elevation on the line 7 7 of Fig. 2. Fig. 8 is a front view of the sleeve which coöperates with the brake-shoe. Fig. 9 is a view of the character of a diagram, showing the equipment of a car in side elevation. Fig. 10 is a fragmentary top plan view of such equipment, and Fig. 11 is a fragmentary view showing the operative connections between the car and the rock-shafts.

My invention relates to improvements in vehicle-brakes, the present brake being designed more particularly for use upon railway-cars.

My object is to provide a brake by means of which a car can be quickly stopped, the wheels being lifted from the track and permitted to rotate freely.

A further object is to combine with the mechanism just described means whereby the wheel itself can be braked.

To these ends and also to improve generally upon devices of the character indicated my invention consists in the various matters hereinafter described and claimed.

In the accompanying drawings I have shown the invention applied to a railway-car.

Referring now more particularly to the drawings, 1 represents the usual car-axle, mounted upon a suitable truck 2, and 3 indicates a wheel mounted upon the said axle in any convenient manner. Pivotally supported upon the axle and in rear of the wheel is a segmental plate 4, which is eccentric to the wheel, so that under normal conditions the wheel projects beyond the said plate and rests upon the track-rail in the usual manner. An outwardly-extending flange 5 upon the said segmental plate (which may be conveniently termed a "lifting-plate") extends about the rim of the wheel and is provided upon its inner face with a recess 6 to receive the usual wheel-flange. The hub of the lifting-plate is provided with inwardly-extending teeth 7, and an annular inwardly-projecting rib 8 upon said lifting-plate and concentric with the hub is provided with recesses or detent-notches 9 at diametrically opposite points.

Extending about the axle is a cylindrical casing 10, and formed upon this casing or otherwise suitably connected to the inner end thereof are plates 11, which engage and slide vertically upon vertical guide-posts 13, which depend from a horizontal bar 14, suitably supported upon the wheel-truck. Mounted in said casing to slide horizontally is a locking bar or bolt 15, which is adapted to coöperate with the recesses 9 in the lifting-plate, said bar being normally held in projected position by means of a leaf-spring 16, whose action is supplemented by a coiled spring 17, interposed between said leaf-spring and the inner head of the said casing.

Splined upon the axle is a sleeve 18, whose forward end is provided with teeth 19, adapted to coöperate with the teeth 7 upon the lifting-plate in order to form a connection between the said sleeve and plate. A yoke 20, suitably pivoted to the casing 10, has arms provided with inwardly-projecting fingers 21, which enter a peripheral recess 22 in the said sleeve, and a reduced portion 23 of the locking-bar 15 is received in the slot between upwardly-extending fingers 24 upon the said yoke, the said fingers 24 and the fingers 21 being upon opposite sides of the pivotal point of the said yoke. The bar 15 has shoulders 25, which lie upon opposite sides of the fingers 24, and movement of the said bar therefore serves to rock the said yoke.

The locking-bar 15 if so connected to some suitable lever or other member 26 upon the car or under the control of the trainmen that the bar can be operated from the car or train. This connection can be effected in many ways, and I have here shown a shaft 27 extending longitudinally beneath the car and rotatably supported in any suitable manner, said shaft having connection by gears or otherwise with a vertical shaft 28, which is in turn connected by beveled gears to a horizontal shaft 29 within the car, the lever 26 extending vertically from said last-mentioned shaft. The levers 26 in several cars constituting a train can be conveniently connected by an operating-cord 30, so that the device can be operated from any part of any car of the train. Arms 31 extend radially from the longitudinal shaft 27, and these arms are pivotally connected to the locking-bars 15. It will of course be understood that preferably each wheel of a car is provided with a lifting-plate and the other mechanism heretofore described. The arms 31 are therefore arranged in pairs, the arms of a pair extending upon opposite sides of the shaft 27, so that as the shaft is rocked in one direction the locking-bars are thrown out of engagement with the lifting-plates, and as the shaft is rocked in the opposite direction the various locking-bars are thrown into engagement with the respective lifting-plates.

The lifting-plates are normally in elevated position, so that the wheels project below the same, and these plates are locked in said position by the locking-bars 15, the bars being therefore in projected position and the shifting yokes 20 thus being held, so that the sleeves 18 are retracted and the teeth 19 are out of engagement with the teeth 7. Each of the said sleeves can thus rotate with the axle without producing any effect upon the particular lifting-plate with which it is intended to operate. When it is desired to stop the train, the shaft 27 is rocked, thus retracting the locking-bolts from engagement with the various lifting-plates and throwing the sleeves 18 into operative connection with the said plates. Under these conditions the rotation of an axle serves to carry the lifting-plates with it.

The operating cord or lever is released almost as soon as pulled, so that the locking-bolts are forced by their springs against the ribs 8, the teeth 7 and 19 being in interengagement when the said bolts abut against said ribs, and as soon as the lifting-plates have made half a revolution the bolts are shot into the proper recesses 9 for locking the plates in lowered position, the sleeves 18 being retracted simultaneously with such movement of the bolts. The ends of the flange 5 of a locking-plate lie close to the tread of the wheel, so that as said locking-plate is turned its flange engages the tread of the rail without shock and the car is gradually lifted to carry its wheel above the track, and as the lifting-plate is locked in its new position a non-rotatable member rests upon the track and the wheels are left free to rotate. The tread-flange of each lifting-plate is provided with a flange 31$^a$, adapted to rest upon the inner side of the rail, and thus prevent derailment of the car.

Each lifting-plate is preferably provided with wedging-blocks, so arranged that such a block is thrown under the plate and wedged between the plate and the track in order to facilitate rapid stopping of the train. At its central point—that is, the point adapted to rest upon the rail when the plate is thrown into operative position—the lifting-plate is provided in its periphery with a recess 32, which extends across the tread-flange 5, and a recess 33, extending across the said flange, is provided in the periphery of the flange upon each side of the said recess 32. Wedge-blocks 34 normally lie in the said recesses 33, said blocks having their inner faces inclined away from the central point of the periphery of the lifting-plate and away from the periphery of said plate, as shown at 35. Each wedge-block is provided with an arm 36, which extends along the outer face of the lifting-plate, and these arms are slidably connected to a finger 37, which lies in the recess or groove 32, so that movement of one of said arms causes movement of the other thereof. A face-plate 38 is secured to the outer face of the lifting-plate and is provided with a raised portion 39, which lies over the arms 36, and thus produces a pocket for the same. The said arms are provided with elongated slots 40, which receive pivot-pins 41, secured in the lifting-plate and face-plate. The said wedge-blocks and the parts connected thereto are so located upon the lifting-plate that they lie at the upper portion of the said plate when the latter is in raised position. The wedge-blocks 34 thus fall by gravity into the recesses 33, and the finger 37 is raised and projected beyond the periphery of the lifting-plate. As the lifting-plate is turned the said finger engages the track and is forced inwardly, thereby forcing the wedge-blocks out of their recesses, and the lifting-plate therefore slides over the forward wedge-block and causes the same to tightly wedge between the rail and the periphery of the said plate, there being sufficient play of the wedge-blocks and between the arms 36 thereof to permit such action. Manifestly as the lifting-plate is returned to normal position the wedge-blocks fall into their recesses, and the finger 37 is again projected.

I shall now describe the means for braking the wheel itself. Vertically slidable in a suitable guide 42 upon the lifting-plate is an arm 43, from whose upper end a brake-shoe 44 extends outwardly, said brake-shoe lying above the tread of the wheel and being preferably received in a suitable recess 45 in the inner face of the lifting-plate. Upon the lower end of the said arm 43 is an inwardly-extending finger 46, whose upper surface tapers upwardly and outwardly, as shown, said finger projecting through a suitable slot 47 in the lifting-plate. Splined or otherwise slidably mounted upon the sleeve 18 is an outer sleeve 48, which is provided near its inner end with a circumferential groove 49. Slidably supported in the casing 10 is a yoke 50, whose arms have fingers 51, which enter the said groove, said yoke being connected to an arm 52 upon a longitudinal shaft 53, the said shaft lying below and corresponding to the shaft 27, and the arms 52 upon said shaft corresponding to the arms 31 upon the shaft 27. The shaft 53 is connected to an operating-lever 54 in the manner in which the shaft 27 is connected to the operating-lever 26, the levers 54 in the various cars being preferably connected by means of a cord 55. Thus rocking of the shaft 53 causes the sleeve 48 to be moved longitudinally upon the sleeve 18.

The outer end of the sleeve 48 is provided with a concentric recess 56, whose encircling wall 57 has its inner face tapering outwardly and upwardly, and about said wall is a rim 58, which is eccentric to the inner face of the wall 57. Thus when the sleeve 48 is moved outwardly the rim 58 extends over the finger 46, and as the sleeve rotates with the shaft the wider portion of the rim 58 moves over the said finger and the brake-shoe is pressed downwardly upon the tread of the wheel. At the widest part of the rim 58 the inner face of said rim coincides with the inner face of the wall 57, and therefore when the widest portion of the rim 58 is in engagement with the finger further outward movement of the sleeve 48 serves to throw the wall 57 into engagement with the said finger, greater pressure being exerted upon the brake-shoe as the tapered wall 57 is forced forwardly. Of course the brake-shoe is forced upon the wheel-tread as long as the finger is engaged, and as soon as the sleeve 48 is moved into normal position the wheel is relieved from pressure, a suitable spring 59, between the arm 43 and the hub of the lifting-plate, serving to raise the said brake-shoe.

Manifestly shafts 27 and 53 upon the various cars can be connected in many ways, and I have here shown each shaft as provided at its ends with a well-known type of socket adapted to receive a coupling-link.

In order to preserve proper relationship between each shaft 27 and 53 and the truck-supported parts connected thereto and at the same time to permit the required swinging of the trucks, each shaft is made in sections, which are connected by universal joints 60, and the sections 61 and 62, which carry the rock-arms, are mounted upon the respective trucks to move therewith. An intermediate section 63 lies between the truck-carried sections 61 and 62, and a coupling-section 64 is connected to the outer end of each of said truck-carried sections.

I am aware that many minor changes in the construction, arrangement, and combination of the several parts of my device can be made and substituted for those herein shown and described without in the least departing from the nature and principle of my invention.

Having thus described my invention, what I claim as new, and desire to secure by Letters Patent, is—

1. In a vehicle-brake or the like, the combination with a vehicle and a wheel thereon, of a pivotally-supported brake-plate, means for normally holding said plate in inoperative position, and means for rocking said plate either forwardly or backwardly to bring the same between the wheel and the surface upon which the same runs; substantially as described.

2. The combination with a vehicle having a wheel, of a pivotally-supported segmental brake-plate, means whereby said plate is normally held in inoperative position, and means for throwing said plate in either direction about its pivot to bring the same between the said wheel and the surface upon which the wheel runs; substantially as described.

3. The combination with a vehicle having an axle and a wheel thereon, of a brake-plate pivotally supported upon said axle, a sleeve slidably mounted upon said axle to rotate therewith, means for causing operative engagement between said sleeve and said plate, and means for moving said sleeve; substantially as described.

4. The combination with a vehicle having an axle and a wheel thereon, of a brake-plate, means for throwing said plate into operative and inoperative positions, and a locking-bolt adapted to engage said plate for locking the same in said positions; substantially as described.

5. The combination with a vehicle having an axle and a wheel thereon, of a casing about said axle and non-rotatably supported, a brake-plate pivotally supported upon said axle, and mechanism for operating said plate housed by said casing; substantially as described.

6. The combination with a vehicle having an axle and a wheel thereon, of a brake-plate pivotally supported upon said axle, a casing about said axle and having movement with the same, suitably-supported guides controlling the movement of said casing, and operative mechanism for said plate housed by said casing; substantially as described.

7. The combination with a vehicle having an axle and a wheel thereon, of a casing about said axle, a pivotally-supported brake-plate, means for throwing said plate into operative and inoperative positions, a locking-bolt supported in said casing and adapted to engage said plate for locking the same, and means for operating said bolt; substantially as described.

8. The combination with a vehicle provided with a wheel, of a brake-plate coöperating with said wheel, means for locking said plate in position, means for moving said plate into another position, and connection between said locking means and said moving means whereby said locking means is thrown out of operative position when said moving means is thrown into operative position; substantially as described.

9. The combination with a vehicle having a wheel, of a brake-plate coöperating therewith, a bolt for locking said plate in position, a slidable clutch member adapted to be thrown into engagement with said plate for moving the same into another position, and a pivotally-supported member between said locking-bolt and said clutch member whereby movement of one of said parts into operative position throws the other thereof into inoperative position; substantially as described.

10. The combination with a vehicle having an axle and a wheel thereon, of a brake-plate pivotally supported upon said axle, a sleeve rotatable with said axle and slidably mounted thereon, means for effecting operative connection between said sleeve and said plate, a locking-bolt, and a pivotally-supported shifting member connected to said bolt to be moved thereby and having connection with said sleeve to permit rotation of the latter, whereby movement of the bolt into inoperative position effects movement of the said sleeve into operative position; substantially as described.

11. The combination with a vehicle having a wheel, of a brake-plate provided with a recess opening upon its periphery, means for interposing said plate between said wheel and the surface upon which the same runs, and a wedging-block in said recess adapted to be thrown therefrom and interposed between the said plate and the said surface when the plate is thrown into operative position; substantially as described.

12. The combination with a vehicle having a wheel, of a brake-plate provided with a recess opening upon its periphery at the upper portion of said plate when the same is in inoperative position, means for interposing said plate between said wheel and the surface upon which the same runs and thus lowering the portion of said plate provided with said recess, and a wedging-block in said recess adapted to be wedged between the said plate and the said surface when the plate is thrown into operative position; substantially as described.

13. The combination with a vehicle having a wheel, of a brake-plate, means for interposing said plate between said wheel and the surface upon which the same runs, and a wedging-block pivotally and slidably supported upon said plate and adapted to wedge between said plate and the said surface when the plate is thrown into operative position; substantially as described.

14. The combination with a vehicle having a wheel, of a brake-plate, means for interposing said plate between said wheel and the surface upon which the same runs, a housed wedging-block for said plate, and means for projecting said wedging-block into operative position when said plate is thrown into operative position; substantially as described.

15. The combination with a vehicle having a wheel, of a brake-plate having a recess, means for interposing said plate between the wheel and the surface upon which the same runs, a wedging-block in said recess, a pivoted arm connected to said block, and a member upon said arm normally projecting beyond the periphery of said plate, whereby as said plate is thrown into operative position said member is engaged by the surface upon which the wheel runs and the said wedging-block is projected into operative position; substantially as described.

16. The combination with a vehicle having a wheel, of a brake-plate, means for interposing said plate between the wheel and the surface upon which the same runs, a wedging-block supported upon said plate, an arm upon said wedging-block and pivotally supported at the side of the said plate, and a face-plate upon said first-mentioned plate and provided with a pocket receiving said arm; substantially as described.

17. The combination with a vehicle having a wheel, of a brake-plate, means for interposing said plate between the wheel and the surface upon which the same runs, a brake-shoe for said wheel supported upon said plate, and means for independently operating said plate and said brake-shoe; substantially as described.

18. The combination with a vehicle having a wheel, of a brake-shoe therefor, a rotatable slidable member provided with a recess having a cam-wall, a part connected to said brake-shoe adapted to be received in said recess, and means for sliding said rotatable member; substantially as described.

19. The combination with a vehicle having a wheel, of a brake-shoe therefor, a rotatable slidable member having a circular recess, a rim upon said member having a cam-wall leading to said circular recess, a part connected to said brake-shoe adapted to be engaged by said rim and to enter said circular recess, and means for moving said member to cause the same to engage said part; substantially as described.

20. The combination with a vehicle having an axle and a wheel thereon, of a pivotally-supported brake-plate adapted to be interposed between the said wheel and the surface upon which the same runs, a sleeve rotatably and slidably supported upon said axle, means whereby said sleeve can engage said plate for throwing the same about its pivot, a brake-shoe for the wheel, a sleeve rotatably and slidably supported upon said first-mentioned sleeve, means whereby said second-mentioned sleeve can be connected to said brake-shoe for operating the same, and means for sliding said sleeves; substantially as described.

21. The combination with a vehicle having an axle and a wheel thereon, of a brake-plate pivotally supported upon said axle, a brake-shoe slidably supported upon said plate, a sleeve rotatably and slidably supported upon said axle, means whereby said sleeve can engage said plate for throwing the same about said axle, a second sleeve rotatably and slidably supported upon said first-mentioned sleeve, means whereby said second-mentioned sleeve can be connected to said brake-shoe for operating the same, and means for sliding said sleeves; substantially as described.

22. The combination with a car and its truck, of brake members carried by said truck, an operating-shaft section carried by said truck and connected to said brake members, a second shaft-section jointed to said truck-carried shaft-section, operating mechanism carried by the car, and connection between said mechanism and said second shaft-section; substantially as described.

In testimony whereof I hereunto affix my signature, in the presence of two witnesses, this 16th day of August, 1902.

HENRY APPLER.

Witnesses:
GALES P. MOORE,
GEORGE BAKEWELL.